(12) United States Patent
Hsu

(10) Patent No.: US 8,735,753 B2
(45) Date of Patent: May 27, 2014

(54) KEYBOARD HAVING RETRACTING KEYS FOR STORAGE

(75) Inventor: Feng-Hsiung Hsu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 149 days.

(21) Appl. No.: 13/526,380

(22) Filed: Jun. 18, 2012

(65) Prior Publication Data

US 2013/0334018 A1 Dec. 19, 2013

(51) Int. Cl.
*H01H 13/70* (2006.01)
(52) U.S. Cl.
USPC ............... 200/344; 200/345; 361/679.13
(58) Field of Classification Search
USPC ......... 200/341, 344, 345; 361/679.13; 341/32
See application file for complete search history.

(56) References Cited

U.S. PATENT DOCUMENTS

| | | | |
|---|---|---|---|
| 5,532,904 A | 7/1996 | Sellers | |
| 5,587,875 A | 12/1996 | Sellers | |
| 5,590,020 A | 12/1996 | Sellers | |
| 5,602,715 A | 2/1997 | Lempicki et al. | |
| 5,635,928 A * | 6/1997 | Takagi et al. | 341/22 |
| 5,654,872 A | 8/1997 | Sellers | |
| 5,793,605 A | 8/1998 | Sellers | |
| 5,874,696 A * | 2/1999 | Hayashi et al. | 200/5 A |
| 6,297,461 B1 * | 10/2001 | Kamishima | 200/5 A |
| 6,529,370 B1 * | 3/2003 | Kamishima | 361/679.08 |
| 6,559,399 B2 * | 5/2003 | Hsu et al. | 200/344 |
| 6,739,774 B1 | 5/2004 | Lahr | |
| 6,879,317 B2 | 4/2005 | Quinn et al. | |
| 6,950,038 B2 | 9/2005 | Hsu | |
| 7,153,050 B2 | 12/2006 | Liu et al. | |
| 7,375,295 B2 | 5/2008 | Hsu | |
| 7,982,149 B2 | 7/2011 | Larsen et al. | |
| 8,031,087 B2 | 10/2011 | Olodort et al. | |

OTHER PUBLICATIONS

Not Another Geek Website, "Keystick—Collapsible Keyboard—Portable and Clean and Awesome (5 pics)", retreived on Dec. 28, 2011 from <<http://www.nagw.info/news.php?readmore=261>>, Dec. 21, 2009, 3 pages.
The Technology Review, "The Netbook Collapsible Keyboard Concept IWEB", published on May 21, 2011, retrieved on Dec. 28, 2011 from <<http://thetechnologyreview.net/the-netbook-collapsible-keyboard-concept-iweb. html#axzz1ho4jmTyl>>, 1 page.

* cited by examiner

*Primary Examiner* — Vanessa Girardi
(74) *Attorney, Agent, or Firm* — Carole Boelitz; Micky Minhas; Lee & Hayes, PLLC

(57) ABSTRACT

Systems and apparatuses are disclosed that enable ultrathin keyboards and the storing keys of an associated physical keyboard to a storage position. The systems comprise a keycap, a keyswitch mechanism coupled to the keycap, a translatable base frame and a spring mechanism to bias the keycap into an operating position. The biasing mechanism may be an arch-shaped spring mechanism or a magnetic biasing mechanism. A portion of the biasing mechanism may be coupled to the base frame. The base frame is translatable between a first position in which the biasing mechanism imparts a force to bias the keycap into the operating position and a second position in which the portion of the biasing mechanism is repositioned such that the force to bias the keycap is at least partially eliminated. A control member may be provided to translate natural user movement into movement of the base frame for collapsing the keyboard.

20 Claims, 15 Drawing Sheets

Section G-G

Section A-A

Section B-B

Section B-B

Relationship between key displacement and key force

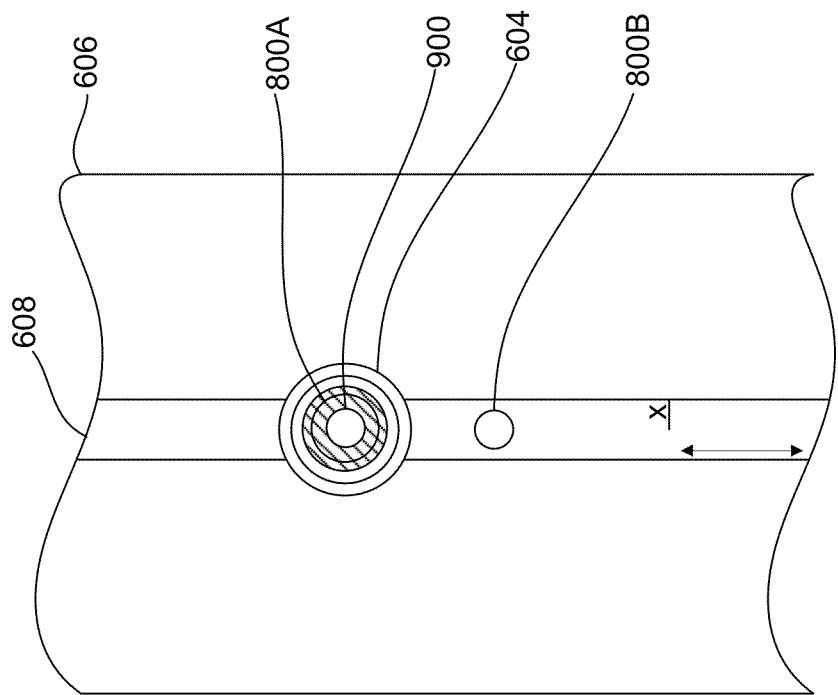
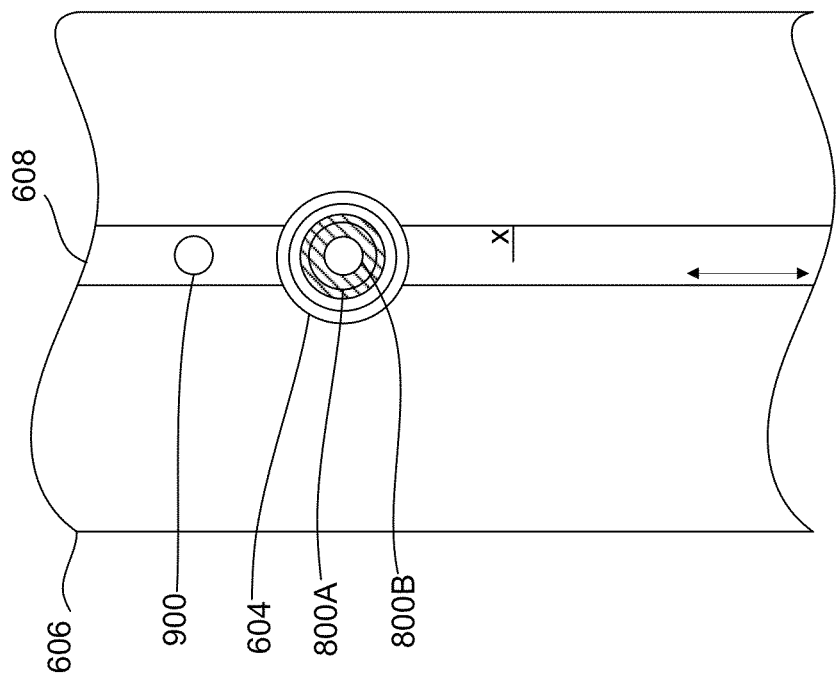

Section E-E

Section E-E

Section F-F

Section F-F

Section F-F

Section E-E

Section G-G

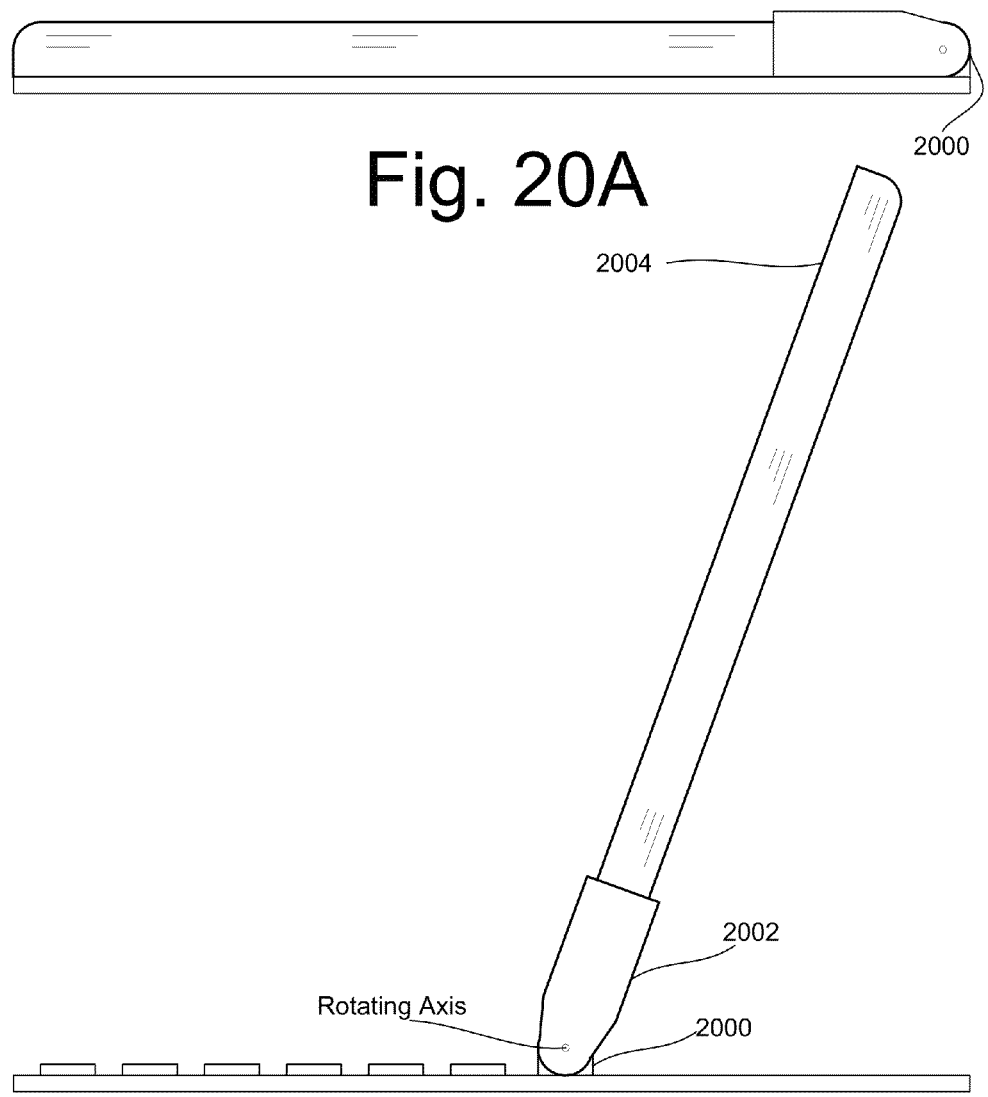
Fig. 20A
Fig. 20B
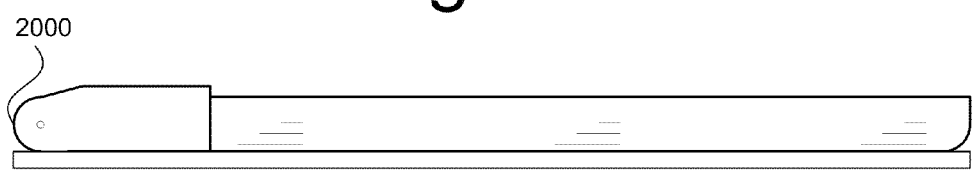
Fig. 20C

KEYBOARD HAVING RETRACTING KEYS FOR STORAGE

BACKGROUND

Keyboards are important and popular input mechanisms for providing input to a variety of computing devices. Notwithstanding the development of various alternative human input technologies, such as touchscreens, voice recognition, and gesture recognition, to name only a few, keyboards remain the most commonly used device for human input to computing devices. Of the mechanical variety, keys may come in several types, including, but not limited to, membrane-based keys, dome-switch keys, scissor-switch keys typically used in laptops today, and mechanical-switch keys. FIG. 1 shows an isometric view of a common telescopic-switch key 100 including a keycap 102 and a telescopic keyswitch mechanism 104 coupled to the keycap 102. FIG. 2 shows an isometric view of a common scissor-switch key 200 including a keycap 202 and a scissor-type keyswitch mechanism 204 coupled to the keycap 202. Both have proven to be effective keyswitch mechanisms.

FIG. 3 shows a side elevation view of the key 100 shown in FIG. 1 through section line A-A. The key 100 includes the keycap 102, the telescopic keyswitch mechanism 104 coupled to the keycap 102, a base 300 coupled to the keyswitch mechanism 104, and a spring 302 used to bias the keycap 102 into an operating position. The spring 302 biases the keycap 102 by imparting a force on the keycap 102 relative to the base 300 such that the keycap 102 resists being pressed toward the base 300 when the key 100 is actuated by a user. Spring 302 may be designed to "buckle" upon sufficient force applied to the key 100 whereby a snapping action provides a tactile sensation to a user actuating the key 100. A mechanism may be provided for detecting a keystroke upon actuation of the key 100 by a user. Such a mechanism for detecting a keystroke may include, but is not limited to, a pair of contacts that close to complete an electrical circuit, a capacitive sensor assembly comprising electrodes with varying mutual capacitance which changes with relative movement of a metal piece on, or in, either the keycap 102 or the base 300, and similar mechanisms. Furthermore, although a three-stage keyswitch mechanism 104 is shown, which provides a more dramatic collapsing effect, a two-stage mechanism is often used in keys with this design.

In order to keep up with consumer demand for smaller, more portable computing devices, keyboard designs have also moved toward correspondingly thinner and smaller designs. Making the keyboard smaller with respect to the total area of the keyboard works in tension with the need for keyboards to remain usable given the size constraints of the human finger that is used for actuating the keyboard elements, or keys. The thickness of the keyboard, however, can still be improved to provide a thinner, sleeker design for either the computing device in which it is embedded, or the keyboard peripheral itself, making for improved portability of the device.

In addition to designing the keyboard as thin as possible, some attempts have been made to collapse a keyboard when it is not in operation in order to further minimize the thickness of the keyboard while it is in a stored position. FIG. 4A illustrates one solution. FIG. 4A shows a side elevation view of the key 200 shown in FIG. 2 through section line B-B. The key 200 includes the keycap 202, the scissor-type keyswitch mechanism 204 coupled to the keycap 202, a base 400 coupled to the keyswitch mechanism 204, and a dome-type spring mechanism 402 to bias the keycap 202 into an operating position. In this arrangement, both a dome-type spring mechanism 402 and a lower right sliding leg of the scissor-type keyswitch mechanism 204 may be moved in a direction parallel to a plane of the base 400 to allow the key to collapse. FIG. 4B illustrates an alternate solution where a spring 404 for biasing the keycap 202 into an operating position is coupled to the lower right sliding leg of the scissor-type keyswitch mechanism 204 and is moved in a direction parallel to the plane of the base 400 to allow the key to collapse. These known approaches, however, have yet to be successfully commercialized.

Another approach to minimizing the thickness of a keyboard is to reduce the travel distance for the keys (i.e. the distance that a keycap travels upon actuation in order to register a keystroke). FIG. 5 illustrates a force-to-displacement function of a typical spring (e.g. a dome spring) used in current keyboards. Assuming a travel distance of 2 mm for actuating the key, the rising part of the curve on the left side of the graph shown in FIG. 5 corresponds to roughly 1 mm of initial travel before the snap point of the key. Since this initial travel distance does not contribute to the actuation of the key in order to register a keystroke, the travel distance of current keyboard designs that include this initial travel distance may have a thickness dimension that can be reduced by at least this initial travel distance. The claimed subject matter, however, is not limited to implementations that solve any or all of the aforementioned disadvantages.

Furthermore, an ultrathin keyboard is prone to be relatively lightweight by itself. Consequently, when an ultrathin keyboard is integrated with a slate-like computing device, for example, the weight distribution may become an issue. Specifically, the center of gravity of such an integrated device is often located such that the integrated device is unstable in an operational configuration. In addition, various existing designs for integrating keyboards with slate computers enable limited, or no, options for adjusting the viewing angle for the display when the device is in an operational position. The claimed subject matter, however, is not limited to implementations that solve any or all of the aforementioned disadvantages.

SUMMARY

Disclosed are systems and architectures for storing the keys of an ultrathin keyboard. A plurality of keys that make up the keyboard each comprise a keycap, a keyswitch mechanism coupled to the keycap, and a biasing mechanism to bias the keycap into an operating position so it can be used by a human operator when the keyboard is in an operational mode. The system further includes a base frame to which a portion of the biasing mechanism is attached either directly or indirectly through connecting elements. A control member may be configured to engage the base frame such that upon actuation of the control member using natural user movement (e.g. rotation via opening a lid of a laptop or similar device, or via translation through sliding the control member), the base frame (or portion thereof) is moved in a direction parallel to a plane of the base frame. Consequently, the portions of the biasing mechanism coupled to the base frame are shifted in position such that the keys may collapse into a storage position.

In some embodiments, the biasing mechanism of each key is a magnetic biasing mechanism comprising a first magnetic portion coupled to either the keycap or the keyswitch mechanism, and a second magnetic portion coupled to the base frame. When the base frame is moved from a first position to a second position, the second magnetic portion is offset from the first magnetic portion with respect to an axis running from the keycaps to the base frame that is perpendicular to a plane of the base frame, thereby causing the key to collapse into a storage position and effectively disabling the biasing mechanism.

In some embodiments, the biasing mechanism of each key is an arch-shaped spring mechanism comprising a first portion with two fixed endpoints coupled to either the keycap or the keyswitch mechanism and a second portion coupled to the base frame. Alternatively, the arch-shaped spring mechanism may be inverted in orientation with the first portion coupled to the base frame and the second portion coupled to either the keycap or the keyswitch mechanism. The base frame may be movable to collapse the key into a storage position. When the base frame (or portion thereof) is moved from a first position to a second position, the portion of the arch-shaped spring mechanism that is coupled to the base frame is moved in a direction parallel to a plane of the base frame such that the force to bias the keycap in the operating position is substantially eliminated, thereby allowing the keys to collapse into the storage position and effectively disabling the biasing mechanism.

In some embodiments, systems and architectures are disclosed to reduce the travel distance of the keys and thus provide another means to reduce the keyboard thickness. A biasing mechanism, such as an arch-shaped spring, is configured to be used in a keyboard key. The biasing mechanism has a Geometric Arch Parameter, $\lambda$, which is a function of an arch span angle, a radius of the circle comprising the arch curve, and the thickness of the arch. By using a biasing mechanism with a low Geometric Arch Parameter, $\lambda$, the biasing mechanism is thereby made stiffer causing a corresponding faster rise to the force at the snap point with respect to key displacement. Thus, the travel distance may be further minimized due to a smaller displacement of the key before the force at the snap point is reached.

In additional embodiments, systems and architectures are disclosed to integrate ultrathin keyboards that may have storable keys with slate computers to create a laptop-like computing device that is both stable and allows multiple display tilt angles for allowing a user to view the display from different vantage points.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 9A is a top perspective view of the storable key shown in FIG. 6 in an operating position including a telescopic keyswitch mechanism and a magnetic biasing mechanism.

FIG. 9B is a top perspective view of the storable key shown in FIG. 6 in a storage position including a telescopic keyswitch mechanism and a magnetic biasing mechanism.

FIG. 20A is a side perspective view of a system in a stored position with an exemplary display facing toward the keyboard and a sliding control member which controls the collapsing/reengaging of the keyboard through a sliding action.

FIG. 20B is a side perspective view of the system in FIG. 20A when the system is in an operational position.

FIG. 20C is a side perspective view of the system in FIG. 20A when the keyboard is in a stored position with the exemplary display facing away from the keyboard in a "slate" mode.

DETAILED DESCRIPTION

Overview

Figure 1:
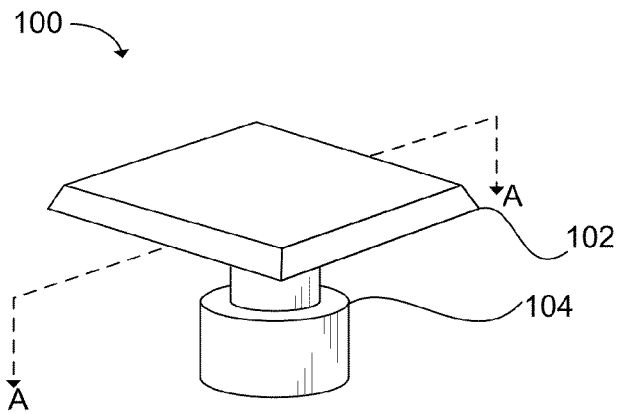
FIG. 1 is an isometric view of a key with a telescopic-type keyswitch structure.
Figure 2:
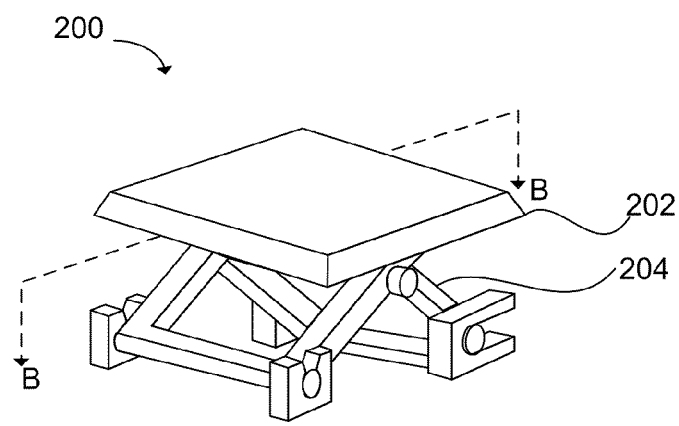
FIG. 2 is an isometric view of a key with a scissor-type keyswitch structure.
Figure 3:
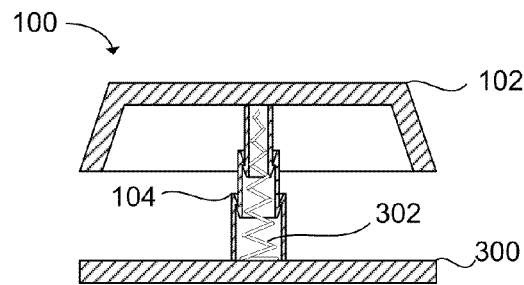
FIG. 3 is a side elevation view of an exemplary telescopic-type keyswitch structure shown in FIG. 1 and including a spring mechanism for biasing the keycap into an operating position.
Figure 4A:
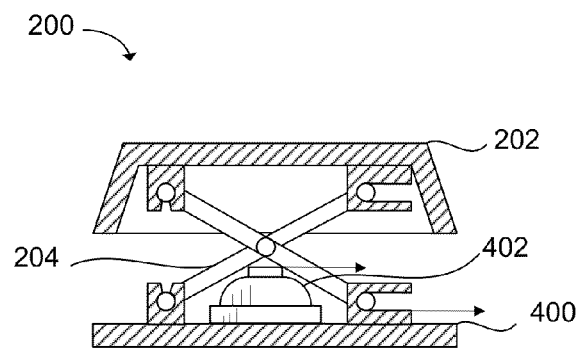
FIG. 4A is a side elevation view of a prior art exemplary collapsible scissor-type keyswitch structure shown in FIG. 2 and including a dome-type spring mechanism for biasing the keycap into an operating position.
Figure 4B:
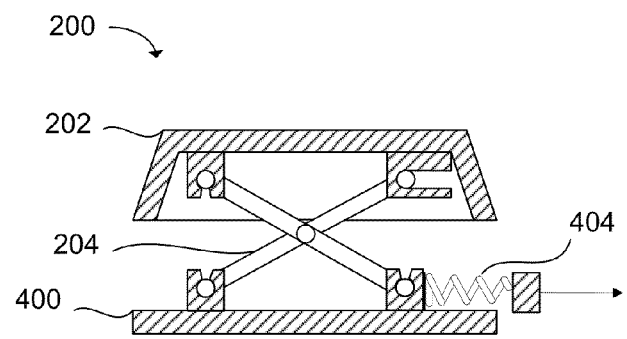
FIG. 4B is a side elevation view of a prior art exemplary collapsible scissor-type keyswitch structure shown in FIG. 2 and including a spring coupled to the lower right sliding end point of the scissor mechanism for biasing the keycap into an operating position.
Figure 5:
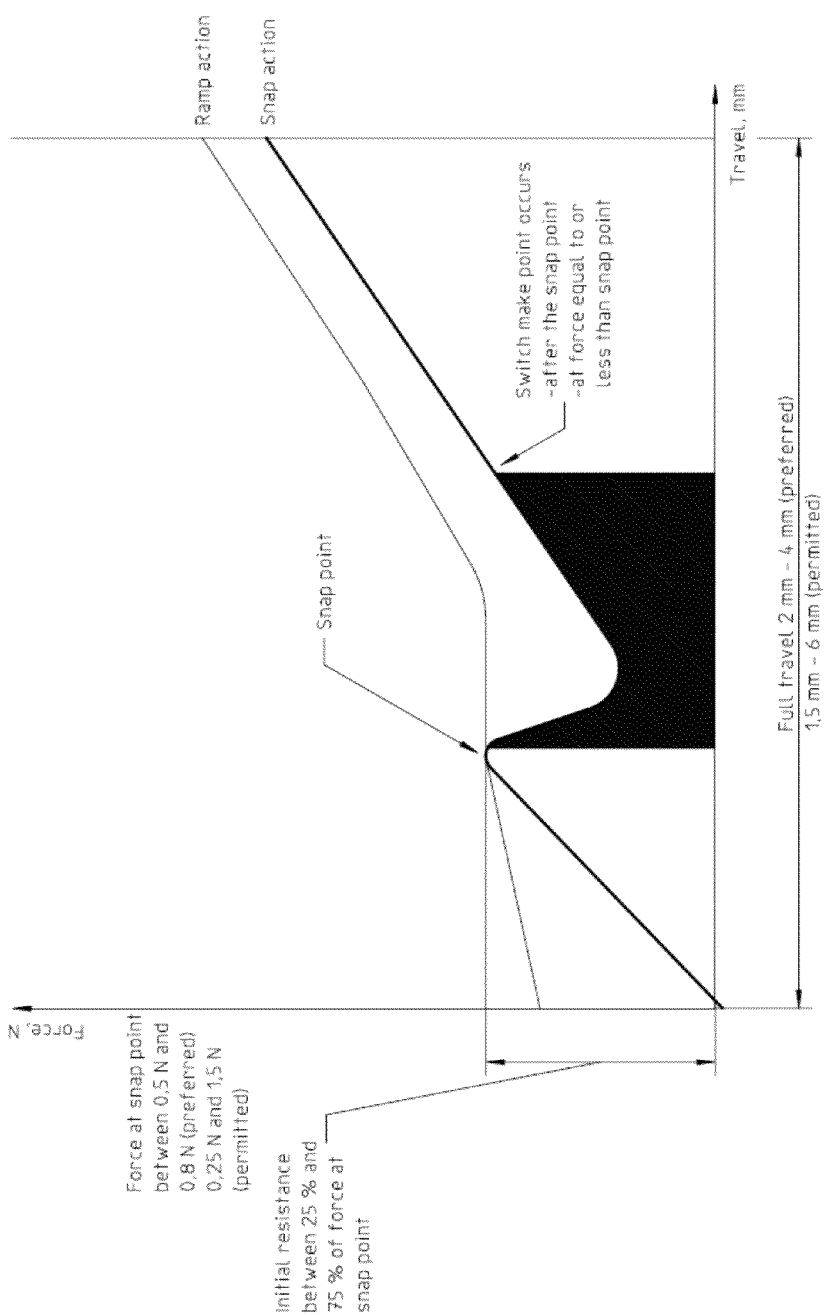
FIG. 5 shows a force-to-displacement function of a typical spring used in current keyboards.

Systems and apparatuses are disclosed for storing the keys of an associated physical keyboard into a storage position, and for reducing the travel distance of the keys. The term "keyboard", as used herein, includes any type of input device comprising an arrangement of physical keys, buttons, or similar elements, including, but not limited to, keypads. The disclosed system finds particular application to keyboards integrated with, or used as a peripheral device to, slate-type computing devices (referred to herein as "slate computers"), tablets, notebooks or laptop computers, etc., where the desire to have a thin, sleek form factor is paramount for improved portability, among other things. However, the disclosed system could work equally well with any computing device or keyboard peripheral, such as those used with traditional desktop computers, mobile phones, gaming systems, remote control devices, or any other keyboard for various suitable applications.

In some embodiments, an arch-shaped spring design is used with a scissor-type keyswitch mechanism. The term "arch spring", or "arch-shaped spring", as used herein, includes any type of spring, or biasing mechanism, including a biasing member in a curved, or arch, shape with two fixed endpoints, where the curved, or arch, shape is utilized to affect a biasing reactive force when a location near the apex of the arch is pressed upon. Arch-shaped springs may include, but are not limited to, leaf springs.

In various embodiments, by using a movable base frame coupled to the biasing mechanism in order to disengage the biasing mechanism, the keys of the keyboard may collapse into a storage position. Using either a magnetic biasing mechanism or an arch-shaped spring mechanism provides a design with low complexity which does not suffer from excessive friction. Furthermore, assuming a travel distance of the key on the order of 2 mm, and a minimum substrate thickness of 0.5 mm, the keyboard may be reduced from roughly 4.5 to 5 mm thick in an operational position to roughly 2.5 to 3 mm thick in the stored position. Therefore, the thickness of the keyboard may be reduced by 2 mm under the above constraints, giving a sleeker, thinner profile to the keyboard itself, or to the device that it is embedded within. Thus, the system finds particular application to keyboards integrated with, or used as a peripheral device to, slate computers, tablets, and the like, but any conventional keyboard may benefit from the disclosed system, and the system is not limited therefore to any particular application.

In further embodiments, systems and architectures are disclosed for reducing the travel distance of the keys in order to further reduce the keyboard thickness. A biasing mechanism, such as an arch-shaped spring, is configured to be used in a keyboard key. The biasing mechanism has a Geometric Arch Parameter, $\lambda$, which is a function of an arch span angle, a radius of the circle comprising the arch curve, and the thickness of the arch. By using a biasing mechanism with a low Geometric Arch Parameter, $\lambda$, the biasing mechanism is thereby made stiffer causing a corresponding faster rise to the force at the snap point with respect to key displacement. Thus, the travel distance may be further minimized due to a smaller displacement of the key before the force at the snap point is reached. For instance, if the travel distance is reduced to 1 mm, the aforementioned keyboard would have a thickness of 3.5 to 4 mm (potentially a 2× reduction in keyboard thickness) in an operational position and a thickness of 1.5 to 2 mm (potentially a 1× reduction in keyboard thickness) in a storage position. The reduction in thickness of the keyboard in the storage position is due to the fact that the thickness of the keycap is directly proportional to the travel distance, such that a reduction in travel distance can lead to a reduction in keycap thickness.

In exemplary embodiments, systems and architectures are disclosed for combining a slate computer with a keyboard as described above that enables adjustment of the display of the slate computer between various angles while the system is in an operational position. The disclosed systems and architectures also have the benefit of a combined center of gravity within the keyboard base to ensure mechanical stability of the system in the operational position when positioned on a substantially flat surface, such as a table or the lap of a user.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without some of these specific details. Example implementations are provided below with reference to the following figures.

Illustrative Operation

Figure 6:
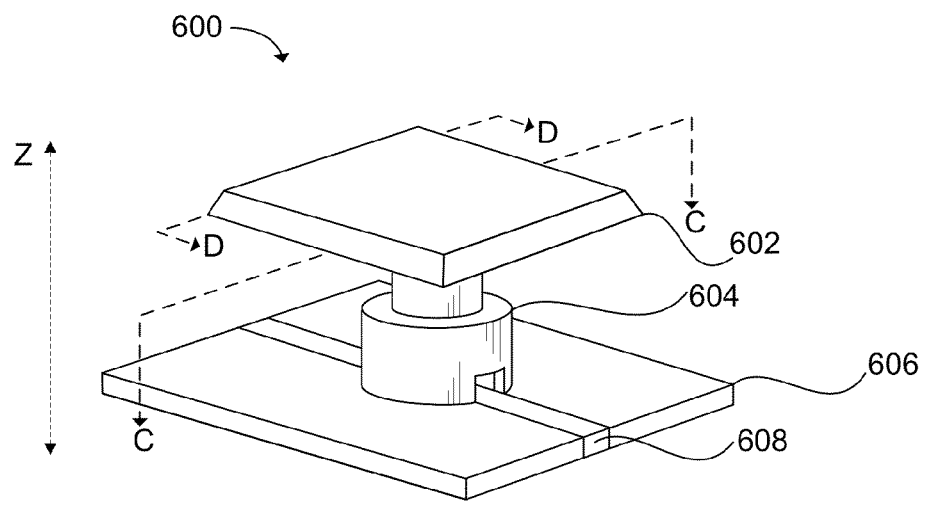
FIG. 6 is an isometric view of a storable key according to some embodiments with a telescopic-type keyswitch structure.
Figure 7:
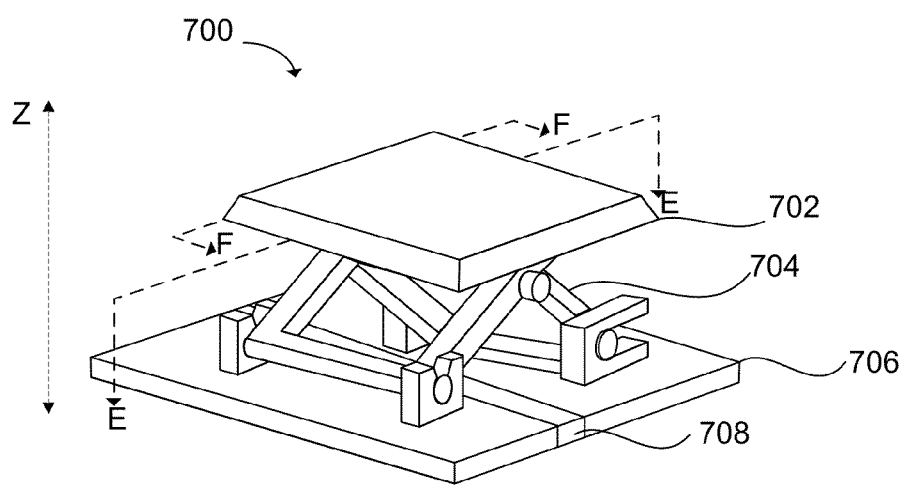
FIG. 7 is an isometric view of a storable key according to some embodiments with a scissor-type keyswitch structure.

FIGS. 6 and 7 are isometric views of systems for storing the keys of an associated keyboard. FIG. 6 illustrates a key 600 in an operating position including a keycap 602, a telescopic keyswitch mechanism 604 coupled to the keycap 602 and configured to enable controlled movement of the keycap 602 along a vertical axis in response to tactile input, a base 606 coupled to the keyswitch mechanism 604, and a base frame 608 that is movably positioned within the base 606. FIG. 7 illustrates a key 700 in an operating position including a keycap 702, a scissor-type keyswitch mechanism 704 coupled to the keycap 702, a base 706 coupled to the keyswitch mechanism 704, and a base frame 708 that is movably positioned within the base 706.

Figure 8B:
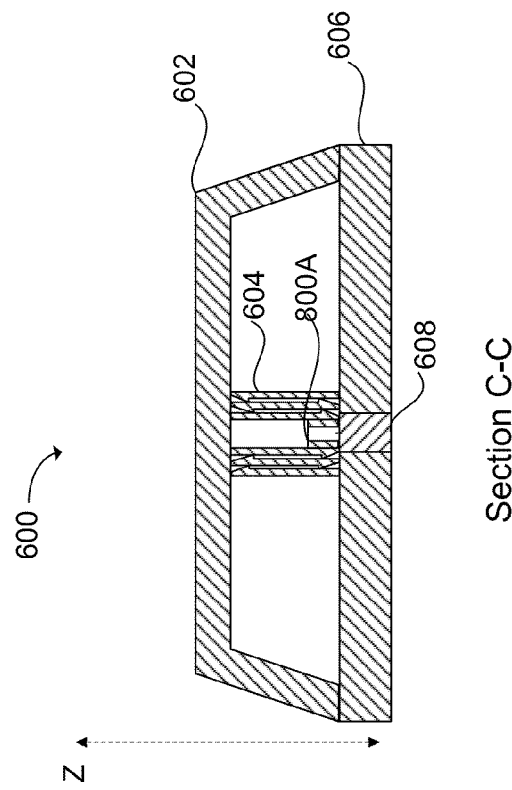
FIG. 8B is a side elevation view of the storable key shown in FIG. 6 in a storage position including a telescopic keyswitch mechanism and a portion of the magnetic biasing mechanism.
Figure 8A:
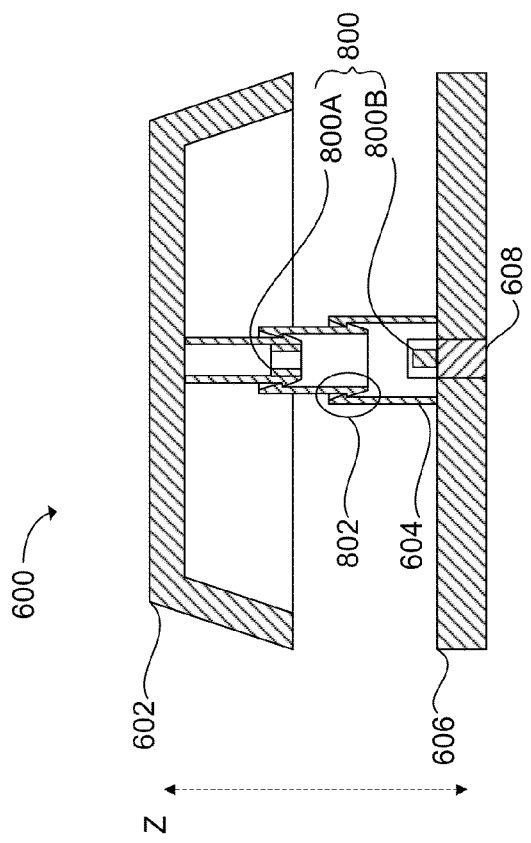
FIG. 8A is a side elevation view of the storable key shown in FIG. 6 in an operating position including a telescopic keyswitch mechanism and a magnetic biasing mechanism.

FIG. 8A shows a side elevation view of the key 600 shown in FIG. 6 from section line C-C with the telescopic keyswitch mechanism 604. The key 600 further includes a magnetic biasing mechanism 800 to bias the keycap 602 into an operating position. The magnetic biasing mechanism 800 comprises an upper magnet 800A, or a first magnetic portion, which may be located within the keycap 602 and coupled to the keyswitch mechanism 604. Upper magnet 800A may alternatively be directly coupled to the keycap 602. The magnetic biasing mechanism 800 further comprises a lower magnet 800B, or a second magnetic portion, coupled to the base frame 608 and which imparts an opposing magnetic force on upper magnet 800A in order to bias the keycap 602 into an operating position when the keyboard is in an operational mode. Mating edges 802 of respective sections of the telescopic keyswitch mechanism 604 are provided in order to maintain the coupling between adjoining sections of the telescopic keyswitch mechanism 604 in the presence of the biasing force between the upper and lower magnets 800A and 800B, and also to maintain an appropriate distance between the keycap 602 and the base 606 when the key 600 is in the operating position. By appropriately selecting and shaping the magnets 800A and 800B, the opposing force between the two magnets 800A and 800B can be made, when the key is being actuated, to first increase and then drop precipitously, thereby creating a snapping action that provides a typical tactile sensation to a user who is actuating the key. Furthermore, by increasing the vertical lengths of each of the two magnets 800A and 800B, the vertical spacing between the two magnets 800A and 800B may be reduced to further reduce the thickness of the key 600. Additionally, the upper magnet 800A may be ring-shaped, but is not limited to a ring shape as many other shapes would work equally well without changing the basic characteristics of the system. The lower magnet 800B may be coupled to the base frame 608 either directly or indirectly via a connecting element. In the case of indirect coupling, the connecting element may be coupled to the base frame 608 and can be any suitable type of coupling mechanism for coupling to the lower magnet 800B that is known to a person having ordinary skill in the art, including, but not limited to, a clamp, lock, hook, latch, snap, adhesive, or any suitable type of coupling mechanism. Base frame 608 is movable with respect to the base 606 in order to shift the position of lower magnet 800B. In some embodiments, the base frame 608 may be positioned underneath, and adjacent to, the base 606 on the side of the base 606 facing away from the keycap 602, with the lower magnet 800B embedded in the base frame 608. Such a design with the base frame 608 provided underneath the base 606 may reduce the friction between the base 606 and the base frame 608 when the base frame 608 is translated with respect to the base 606.

FIG. 8B illustrates the key of FIG. 8A in the storage position. A collapsing effect is caused by the movement of the base frame 608 with respect to the base 606, which consequently causes the position of the lower magnet 800B to shift in a direction parallel to a plane of the base frame 608. It should be noted that the telescopic keyswitch mechanism 604 is merely one possible keyswitch mechanism that works with the disclosed system of FIGS. 8A and 8B, and a scissor-type keyswitch mechanism, for example, or other suitable keyswitch mechanism, would work equally well, such as the one shown in FIG. 7, without changing the basic characteristics of the system. Furthermore, although a three-stage telescopic keyswitch mechanism is shown in FIGS. 8A and 8B, the telescopic keyswitch mechanism 604 could be implemented with any number of stages greater than, or equal to, two.

FIGS. 9A and 9B illustrate systems for storing the keys of an associated keyboard. FIG. 9A shows a top perspective view of the key 600 shown in FIG. 6 from section line D-D in an operational mode while FIG. 9B shows a top perspective view in a collapsed/stored mode. FIG. 9A illustrates the telescopic keyswitch mechanism 604 coupled to the base 606, and the base frame 608 movably positioned with respect to the base 606, with the lower magnet 800B coupled to the base frame 608. When the upper magnet 800A and the lower magnet 800B are substantially aligned along a Z axis running from the keycap 602 to the base 606 and that is perpendicular to a plane of the base 606 (See FIG. 6), the key 600 is in an operational position due to the opposing magnetic force between magnets 800A and 800B.

In some embodiments, the system in FIG. 9A may further include a magnetic element at a location 900 coupled to the base frame 608 and located a distance from lower magnet 800B along a plane of the base frame 608. The magnetic element at the location 900 may include an attractive magnet, or it may be made of magnetic material, such as iron, or a similar material.

FIG. 9B illustrates the system of FIG. 9A after the base frame 608 has been moved a distance substantially equal to the distance between the location 900 and the lower magnet 800B in a direction parallel to the plane of the base frame 608. This movement of the base frame 608 causes lower magnet 800B to shift the distance in a direction parallel to the plane of the base frame 608 and out of alignment with the upper magnet 800A so that the biasing force between magnets 800A and 800B is substantially eliminated. Consequently, gravity will cause the keycap 602 to be influenced toward the base 606 causing the key 600 to collapse into a storage position (toward the location 900) as shown from the side perspective in FIG. 8B. When the magnetic element is included in the system at the location 900, the magnetic element is shifted by the distance such that it is moved into alignment with the upper magnet 800A with respect to the Z axis shown in FIG. 6. The keycap 602 is thereby influenced toward the magnetic element due to an attractive force between the magnetic element and the upper magnet 800A, in addition to a gravitational force, causing the key 600 to collapse into a storage position and further providing a "locked" state where the keycap 602 will not move away from the base 606 if say the keyboard is turned upside down. In the stored position, the magnetic element may be disposed within the upper magnet 800A in the case where the upper magnet 800A is ring-shaped and the magnetic element at the location 900 is sized to fit within the ring of upper magnet 800A.

Figure 10:
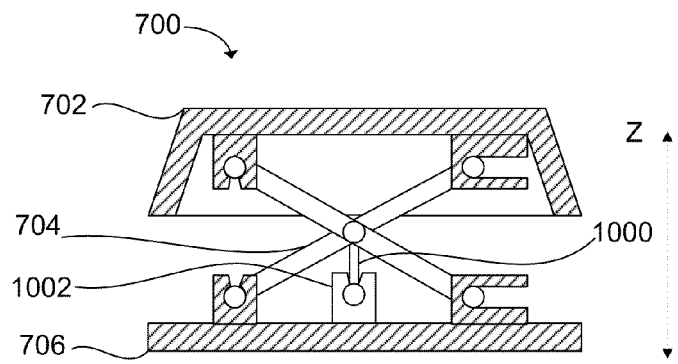
FIG. 10 is a side elevation view of the storable key shown in FIG. 7 in an operating position including a scissor-type keyswitch mechanism and an arch-shaped spring mechanism coupled to the keyswitch mechanism.

FIG. 10 illustrates a system for storing the keys of an associated keyboard. FIG. 10 shows a side elevation view of embodiments of the key 700 shown in FIG. 7 from section line E-E with the scissor-type keyswitch mechanism 704. The key 700 further includes an arch-shaped spring mechanism 1000 to bias the keycap 702 into an operating position. When the key 700 is in an operating position, the arch-shaped spring mechanism 1000 creates a snapping action upon actuation of the key 700 that provides a typical tactile sensation to a user who is actuating the key 700. The arch-shaped spring mechanism 1000 is shown as being coupled to the keyswitch mechanism 704 on the upper end, or first portion, of the arch-shaped spring mechanism 1000 that includes two fixed ends of the arch-shaped spring mechanism 1000, and further coupled to a connecting element 1002 on the lower end of the arch-shaped spring mechanism 1000 that forms the apex of the arch, or second portion. The connecting element 1002 is coupled to the movable base frame 708 and may be any suitable type of rotatable coupling mechanism for coupling to the lower end of the arch-shaped spring mechanism 1000 that is known to a person having ordinary skill in the art, including, but not limited to, a clamp, lock, hook, latch, snap, adhesive, or any suitable type of coupling mechanism. The connecting element 1002 may be rotatable to allow for the relative movement of the lower end of the arch-shaped spring mechanism 1000 when the base frame 708 is translated. The vertical force imposed by the arch-shaped spring mechanism 1000 on the keyswitch mechanism 704 biases the keycap 702 into an operating position when the keyboard is in an operational mode. The base frame 708 is movable to shift the position of connecting element 1002 thereby substantially eliminating the biasing force of arch-shaped spring mechanism 1000 and causing the key 700 to collapse into the storage position.

Figure 11:
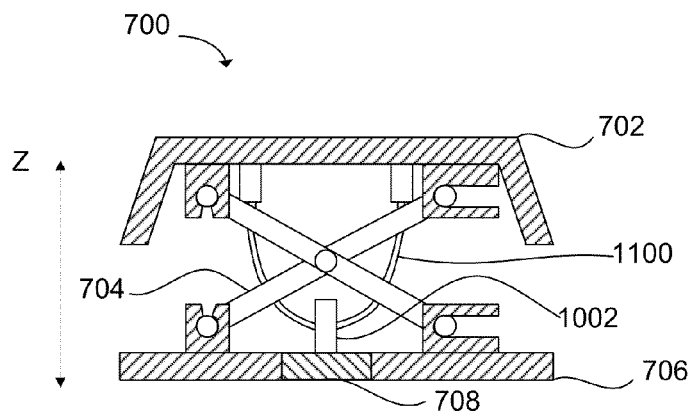
FIG. 11 is a side elevation view of the storable key shown in FIG. 7 in an operating position including a scissor-type keyswitch mechanism and an arch-shaped spring mechanism coupled to the keycap.

FIG. 11 illustrates a system for storing the keys of an associated keyboard. FIG. 11 shows a side elevation view of embodiments of the key 700 shown in FIG. 7 from section line E-E with an arch-shaped spring mechanism 1100 coupled to the keycap 702 on the upper end, or first portion, of the arch-shaped spring mechanism 1100 via rotatable connecting elements in the keycap 702 as an alternate design. As shown in FIG. 11, by coupling the arch-shaped spring mechanism 1100 to the keycap 702, the orientation of the arch-shaped spring mechanism 1100 about a vertical Z-axis may be independent from the orientation of the keyswitch mechanism 704. For instance, the arch-shaped spring mechanism 1100 may be rotated 90 degrees about the vertical Z-axis and oriented similar to the orientation of the arch-shaped spring mechanism 1000 illustrated in FIG. 10.

Figure 12:
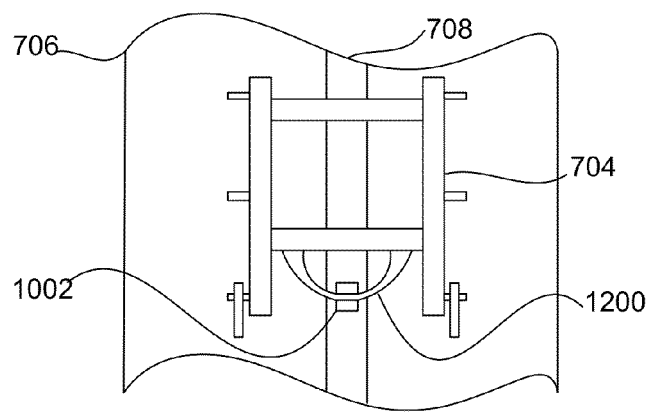
FIG. 12 is a top perspective view of the storable key shown in FIG. 7 in an operating position including a scissor-type keyswitch mechanism and an arch-shaped spring mechanism that is integrally formed as part of the scissor-type keyswitch mechanism.

FIG. 12 illustrates a system for storing the keys of an associated keyboard. FIG. 12 shows a top perspective view of yet another embodiment of the key 700 of FIG. 7 from section line F-F where an arch-shaped spring mechanism 1200 is integrally formed as part of the scissor-type keyswitch mechanism 704 and the connecting element 1002 is coupled to a lower end, or second portion, of arch-shaped spring mechanism 1200 at a location that is offset from a center of the keycap 702 with respect to the Z axis shown in FIG. 7. It should be noted that the arch-shaped spring mechanism 1000, 1100 and 1200 shown in FIGS. 10-12 is merely one possible spring mechanism that works with the disclosed systems of FIGS. 10-12, and other nonlinear spring mechanisms with a similar snapping characteristic would work equally well without changing the basic characteristics of the system, such as the magnetic biasing mechanism 800 described with reference to FIGS. 6, 8A, 8B, 9A, and 9B. Further, the material of the arch-shaped spring mechanism 1000, 1100 or 1200 can be made of the same or similar material as the material used for the scissor-type keyswitch mechanism 704 or a different material altogether.

Figure 13B:
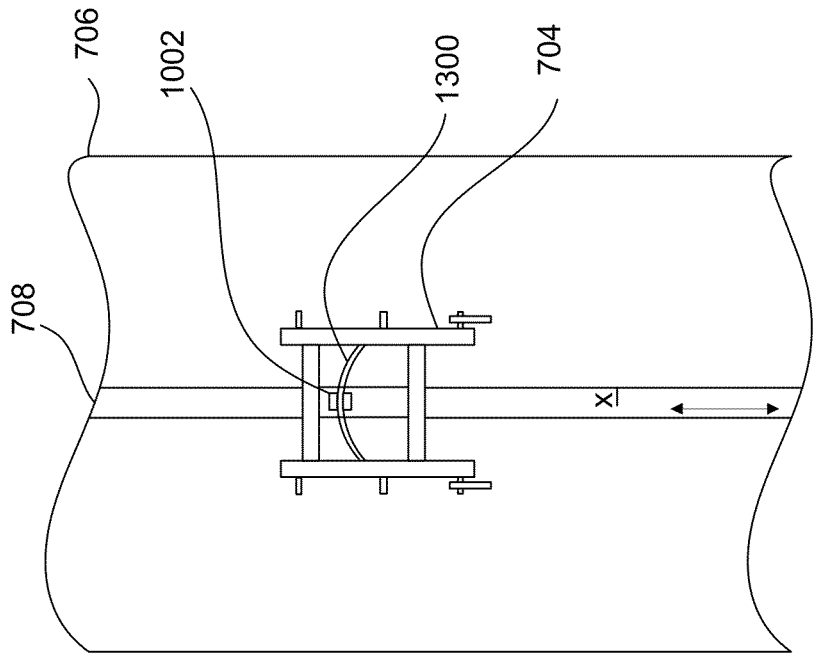
FIG. 13B is a top perspective view of the storable key shown in FIG. 7 in a storage position including a scissor-type keyswitch mechanism and an arch-shaped spring mechanism.
Figure 13A:
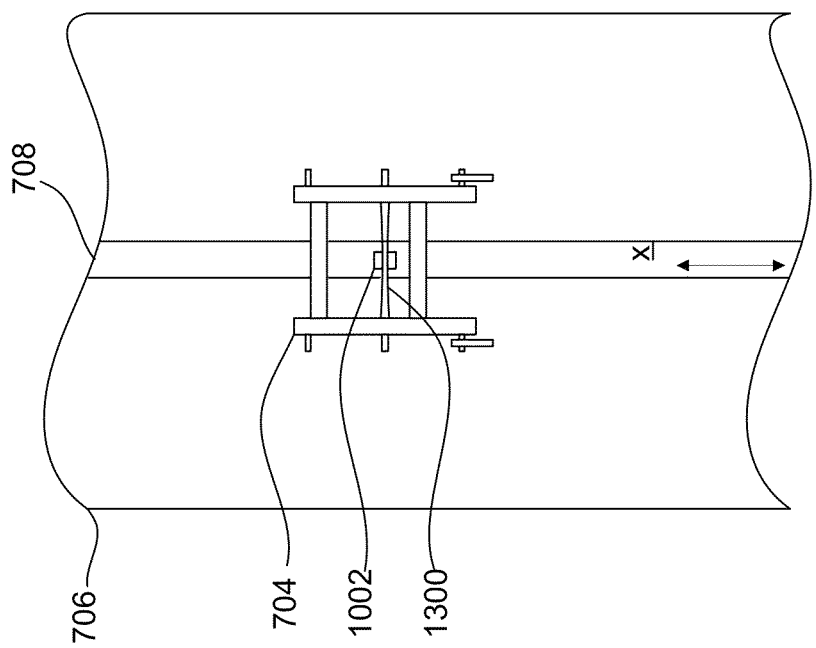
FIG. 13A is a top perspective view of the storable key shown in FIG. 7 in an operating position including a scissor-type keyswitch mechanism and an arch-shaped spring mechanism.

FIGS. 13A and 13B illustrate embodiments of systems to enable storing the keys of an associated keyboard. FIG. 13A shows a top perspective view of the key 700 shown in FIG. 7 from section line F-F in an operational mode while FIG. 13B shows a top perspective view in a collapsed/stored mode. FIG. 13A illustrates the scissor-type keyswitch mechanism 704 coupled to the base 706, and the base frame 708 movably positioned within the base 706, with the connecting element 1002 coupled to the base frame 708. When the upper and lower ends, or first and second portions, of arch-shaped spring mechanism 1300 are substantially aligned with respect to the force vector that is translated through the scissor-type keyswitch mechanism 704 or the keycap 702 upon actuating the key 700, the key 700 is in an operational position due to the biasing force imposed by the arch-shaped spring mechanism 1300 which biases the keycap 702 into an operating position when the keyboard is in an operational mode.

FIG. 13B illustrates the system shown in FIG. 13A after the base frame 708 has been moved a distance in a direction parallel to the plane of the base frame 708. This movement of the base frame 708 causes connecting element 1002 to shift the distance in a direction parallel to the plane of the base frame 708 and out of alignment with the upper end of arch-shaped spring mechanism 1300 with respect to the force vector which biases the keycap 702 into the operating position so that the biasing force of arch-shaped spring mechanism 1300 is substantially eliminated. Consequently, the keycap 702 is influenced toward the base 706 due to tension from the arch-shaped spring mechanism 1300 being moved via the connecting element 1002, in addition to gravity, causing the key 700 to collapse into a storage position. It should be noted that in the embodiments shown in FIGS. 10 and 11, the movement of the base frame 708, as shown in FIG. 13B, causes the connecting element 1002 to move the corresponding distance such that it is shifted out of alignment with a center of the keycap 702 with respect to the Z axis shown in FIG. 7.

Figure 14:
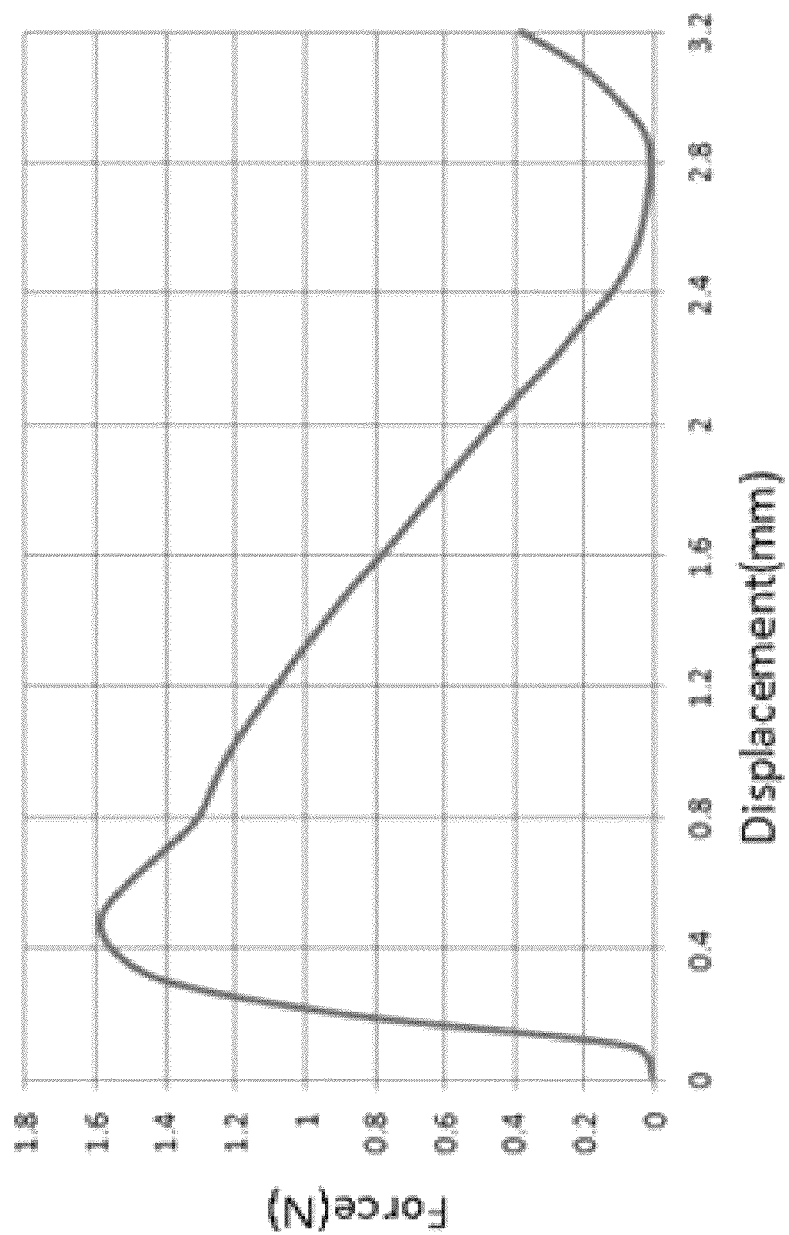
FIG. 14 shows a simulated force-to-displacement function of a spring according to an exemplary embodiment.
Figure 15:
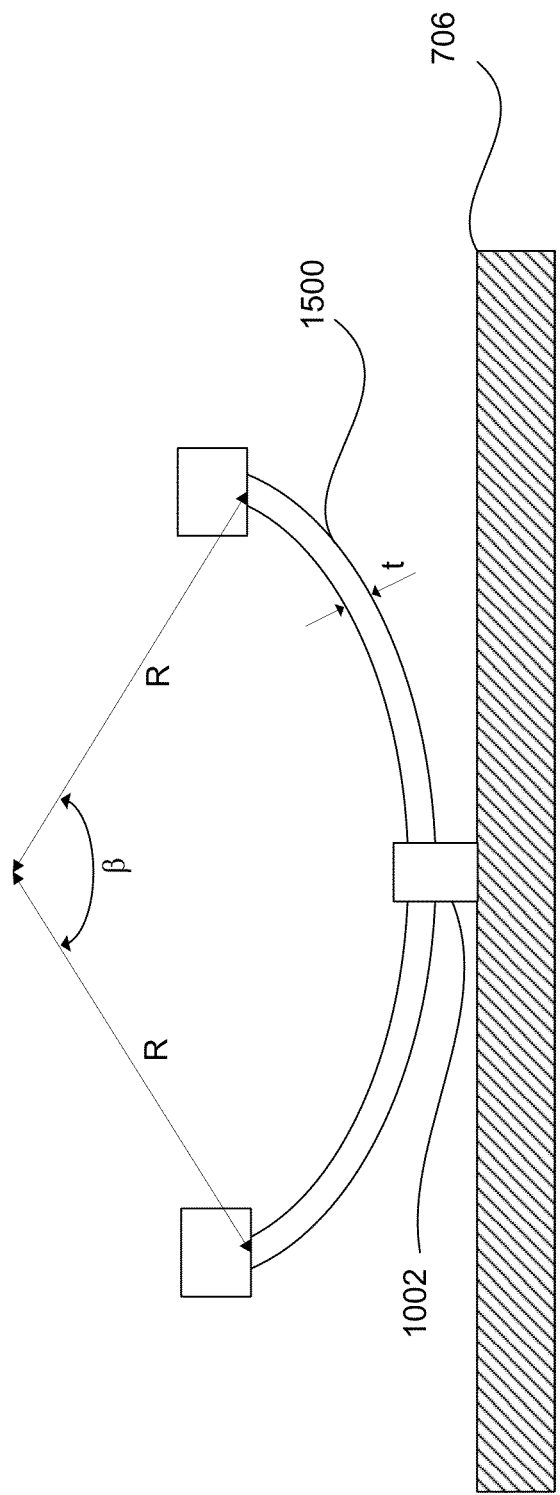
FIG. 15 illustrates an arch-shaped spring according to an exemplary embodiment.

Systems and architectures are further disclosed for reducing the travel distance of the keys of an associated keyboard. FIG. 14 illustrates a simulated force-to-displacement function for an arch-shaped spring with a uniform circular cross section that has been scaled up, or made stiffer, than traditional arch-shaped springs. Although an arch-shaped spring with a circular cross section was used to simulate the force-to-displacement function shown in FIG. 14, arch-shaped springs with various cross section shapes may be used. Such shapes may include, but are not limited to, rectangular, triangular, or the like. A biasing mechanism, such as an arch-shaped spring, is configured to be used in a keyboard key. FIG. 15, illustrates the key 700 shown in FIG. 7 along section line E-E showing only the base 706, and an arch-shaped spring mechanism 1500 coupled to the base 706 via the connecting element 1002, while the remaining components are omitted for illustration. The arch-shaped spring mechanism 1500, or more generally referred to as the biasing mechanism, has a Geometric Arch Parameter, $\lambda$, defined by an arch span angle, $\beta$, a radius of the circle comprising the arch curve, R, and the thickness of the arch, t, such that $$\lambda = \frac{\beta^2 R}{t}.$$

By designing the arch-shaped spring mechanism 1500 with a low Geometric Arch Parameter, $\lambda$, the arch-shaped spring mechanism 1500, or biasing mechanism, is thereby made stiffer causing a corresponding faster rise to the force at the snap point with respect to key displacement. Thus, the travel distance may be further minimized due to a smaller, to no, displacement of the key before the force at the snap point (i.e. the point at which a threshold force needed to actuate the keycap is met or exceeded, causing a snapping tactile sensation for a user actuating the key) is reached. For instance, the travel distance may be reduced to substantially the distance needed for actuation of the key beyond the snap point. This is evidenced by the graph shown in FIG. 14 where there is initially a rise in force that is fast, or steep, relative to the displacement of the key. Any similar biasing mechanism may be used in place of the disclosed arch-shaped spring without changing the basic characteristics of the system. For example, a dome spring with a progressively stiffer, or thicker, center portion may be used to provide a fast-rise force-to-displacement function. Such a dome spring may be desirable given the ubiquity of dome springs in current keyboard designs. Additionally, a magnetic biasing mechanism comprising magnets of longer length may be used to provide a fast-rise force-to-displacement function with a wide valley, as shown in FIG. 14.

Figure 16A:
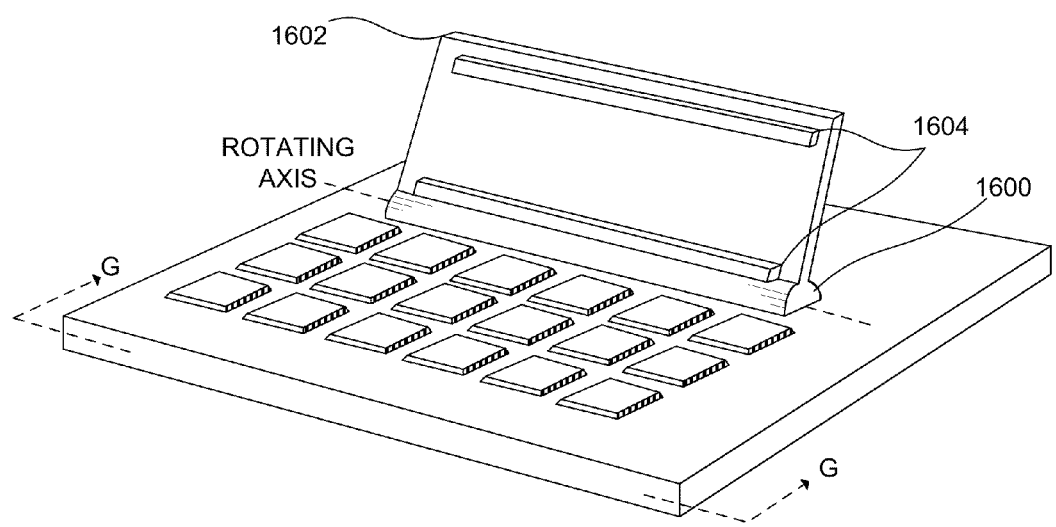
FIG. 16A is an isometric view of a system for implementing a storable keyboard showing how the keyboard may be collapsed/reengaged via rotating a control member about a rotating axis.

FIG. 16A illustrates a system for implementing a storable keyboard showing how the keyboard may be collapsed/reengaged via rotating a control member 1600 that is coupled to a support member 1602 about a rotating axis. Actuation of the support member 1602 about the rotating axis through natural user movement similar to that of opening and closing a cover of a laptop or similar device, for example, enables movement of a base frame, described in more detail below. FIG. 16A shows one example of a design using the support member 1602 to hold a mobile computing device, such as a slate computer or similar device via an attachment mechanism 1604 coupled to the support member 1602. The way in which the control member 1600 engages the base frame in order to move the base frame and store the keyboard will now be described in more detail with reference to FIG. 16B and FIGS. 17A-17C.

Figure 16B:
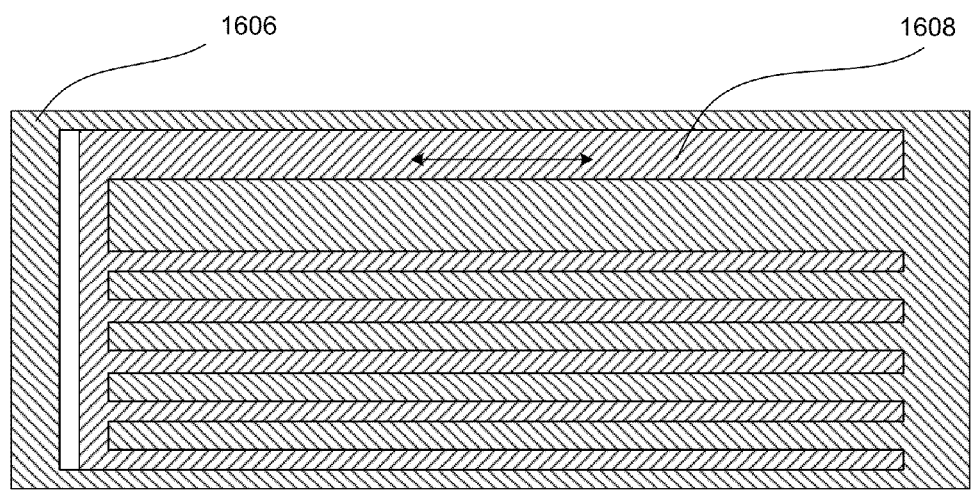
FIG. 16B is a top elevation view of the system shown in FIG. 16A showing how a movable base frame may be integrated with the base of the keyboard system.

FIG. 16B illustrates a top elevation view of the system shown in FIG. 16A from section line G-G where it is shown how a base 1606 of the keyboard may integrate the movable base frame 1608. The base frame 1608 is movable between a first position and a second position such that the keys of the keyboard, as described above, may be collapsed or reengaged, respectively. The configuration shown in FIG. 16B is just one example of how the base frame 1608 may be integrated with the base 1606 of the keyboard. For example, the movement of the base frame 1608 may be in a different direction than the left-to-right directional movement shown in FIG. 16B.

Figure 17A:
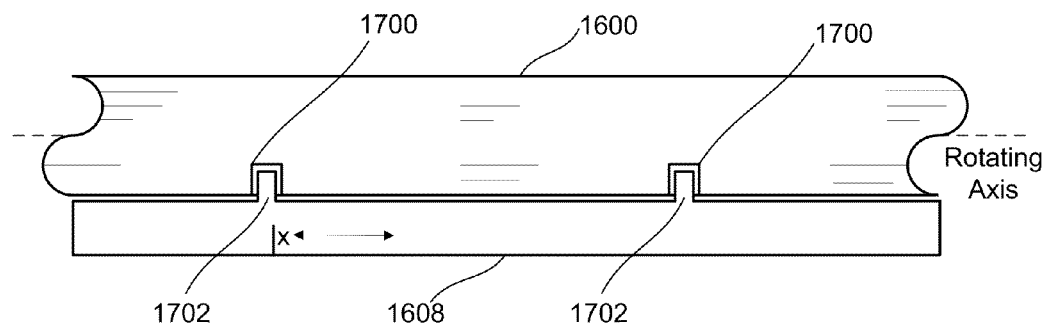
FIG. 17A is a side elevation view of a control member with grooves that engage teeth of the base frame in a first position to enable collapsing/reengaging of the keyboard via rotation of the control member about a rotating axis.

FIG. 17 illustrates a mechanism by which the control member 1600 may engage, and control the movement of, a base frame 1608 in order to collapse and reengage the keyboard as described in detail above. FIG. 17A shows a side perspective view of the control member 1600 engaging the base frame 1608. Grooves 1700 in the control member 1600 engage with teeth 1702 of the base frame 1608 in order to translate mechanical force to the base frame 1608 upon actuation of the control member 1600 about a rotating axis. FIG. 17A shows the base frame 1608 in a first position before the control member 1600 has been actuated.

Figure 17B:
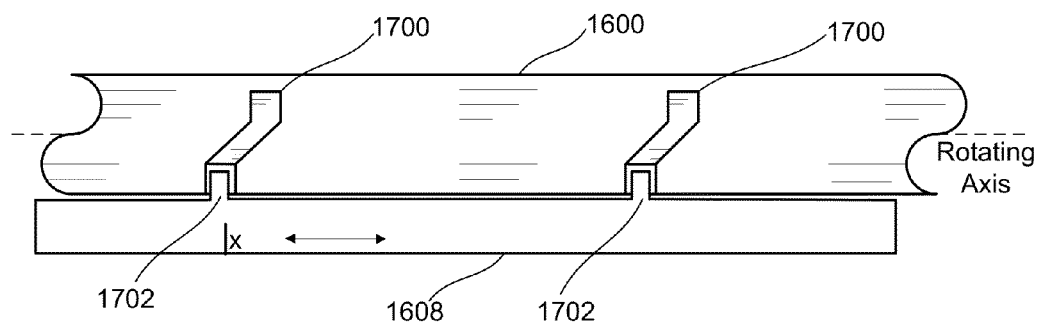
FIG. 17B is a side elevation view of the system in FIG. 16A with the base frame in a second position as a consequence of the control member being actuated about the rotating axis.

FIG. 17B illustrates the system of FIG. 17A after the control member 1600 has been actuated about the rotating axis. As a consequence of actuating the control member 1600 about the rotating axis, the base frame 1608 is thereby translated to a second position via the mechanical engagement between the grooves 1700 in the control member 1600 and the teeth 1702 of the base frame 1608.

Figure 17C:
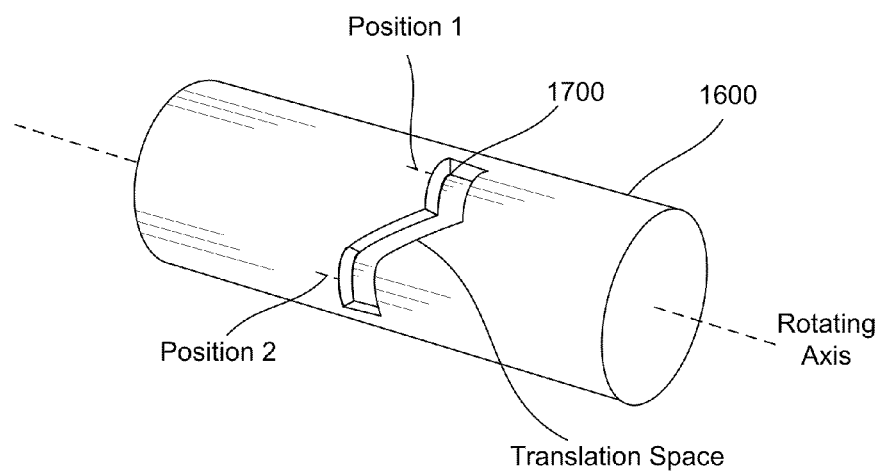
FIG. 17C illustrates a shape of an exemplary groove in the control member that engages a tooth of the base frame to control the collapsing/reengaging of the keyboard through actuation of the control member.

FIG. 17C shows more detail of an exemplary groove 1700 in the control member 1600. It can be seen that by the nature of the shape of the groove 1700, upon actuation of the control member 1600 about the rotating axis, a tooth 1702 is thereby shifted in position in a direction parallel to the rotating axis as it travels along the groove 1700 from a first position to a second position during the actuation of the control member 1600, thereby causing the base frame 1608 to move a distance that will cause the keyboard to collapse or reengage accordingly. It should be noted that the groove 1700 shown in FIG. 17C may be used with a translational control member, rather than the rotating control member 1600, and would work equally well to enable a control member to engage the base frame 1608 such that translational movement of the control member causes the base frame 1608 to move in position without changing the basic characteristics of the system. As disclosed with reference to the aforementioned figures, movement of the base frame 1608 causes the elements that are coupled to the base frame 1608 (e.g. the lower magnets 800B, the magnetic elements at the location 900, or the connecting elements 1002) to move a corresponding distance thereby allowing the keys to collapse into a storage position as described in detail above. The base frame 1608 may be moved in any direction parallel to the plane of the base frame 1608 without changing the basic characteristics of the system. Moving the base frame 1608 in the left to right direction with reference to the front of the system shown in FIG. 16B may be appropriate when the diameter of the rotating axis, about which the support member 1602 is rotated, is sufficiently small such that any corresponding translational movement of the base frame 1608 in a forward and backward direction with respect to the front of the system shown in FIG. 16B would not be enough to fully collapse or reengage the keyboard. However, when the diameter of the rotating axis is sufficiently large, an engagement with the base frame 1608 may be designed such that the base frame 1608 may be moved in a direction that is forward and backward with respect to the front of the system shown in FIG. 16B.

An ultrathin keyboard as described herein tends to be relatively light in terms of weight, especially relative to the weight of a slate computer, for example, which may be well over one pound in weight. One way to integrate a slate computer with the ultrathin, storable keyboard systems and architectures as disclosed herein is illustrated in FIG. 16A, described above. A slate computer may be coupled to support member 1602 via an attachment mechanism 1604, which may include, but is not limited to, magnets, clamps, adhesive, hooks, latches, locks, pins, screws, grooves, etc. In the design shown in FIG. 16A, the slate computer is positioned near the center of the keyboard base, with a combined structure that is stable, as a consequence.

Figure 18A:
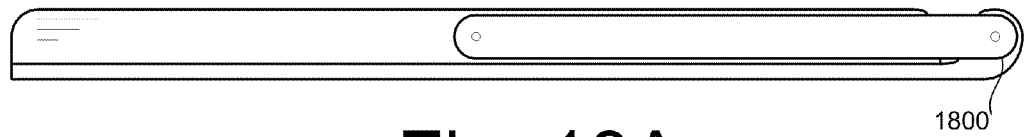
FIG. 18A is a side elevation view of a system in a stored position with an exemplary display facing toward the keyboard and a rotating control member toward the middle of the device.
Figure 18B:
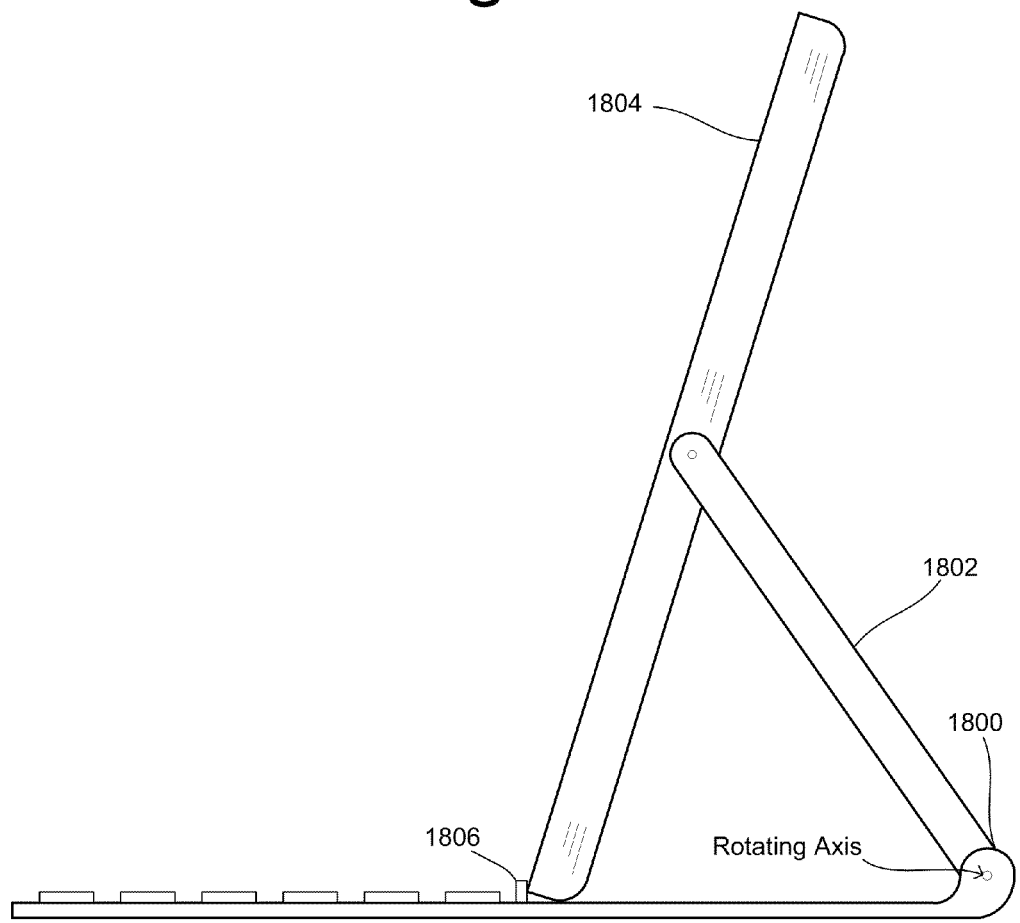
FIG. 18B is a side perspective view of the system in FIG. 18A when the system is in an operational position.
Figure 18C:
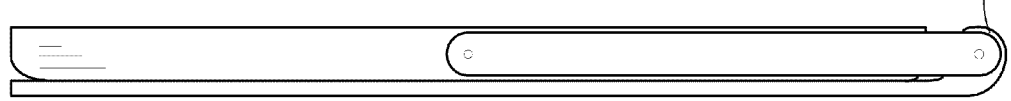
FIG. 18C is a side perspective view of the system in FIG. 18A when the keyboard is in a stored position with the exemplary display facing away from the keyboard in a "slate" mode.

FIGS. 18A-18C show side perspective views of a system for implementing the storable, or ultrathin, keyboard in a stored mode, operational mode, and slate mode, respectively. Upon actuation of a control member 1800 about a rotating axis, which may be located toward one end of the system, the aforementioned base frame within the keyboard is moved, causing the keyboard to collapse into a storage position, as shown in FIGS. 18A and 18C, or reengage/pop-up, as shown in FIG. 18B. When in the operational mode, as shown in FIG. 18B, support members 1802 may support a device 1804, such as a display, tablet, slate computer, or similar device, for viewing by a user. The support members 1802 may be arm-like members coupled between the control member 1800 and an attachment point on the device 1804 that support device 1804 as shown in FIG. 18B. A pop-up stop 1806 may be provided toward the center of the system that protrudes from the keyboard upon actuation of the control member 1800 such that the device 1804 may be further supported at a viewing angle when the system is in an operational position as shown in FIG. 18B. Furthermore, the configuration shown in FIGS. 18A-18C may be used with the ultrathin keyboard embodiments and/or with the storable keyboard embodiments, both described above.

Figure 19A:
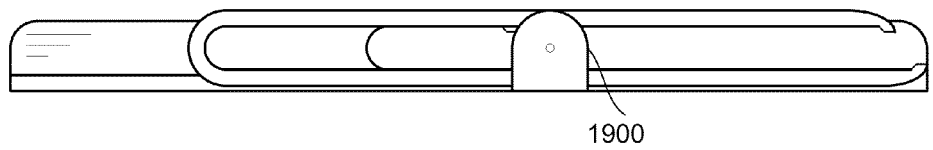
FIG. 19A is a side elevation view of a system in a stored position with an exemplary display facing toward the keyboard and a rotating control member toward the middle of the device.
Figure 19B:
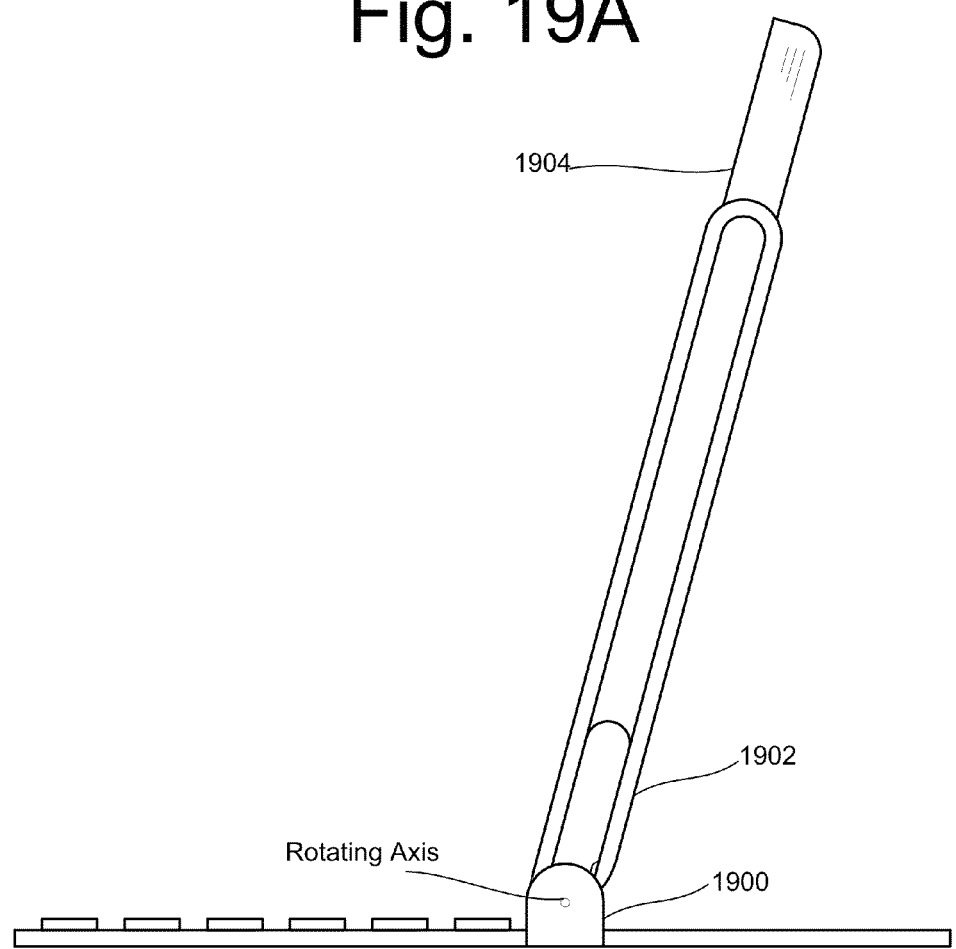
FIG. 19B is a side perspective view of the system in FIG. 19A when the system is in an operational position.
Figure 19C:
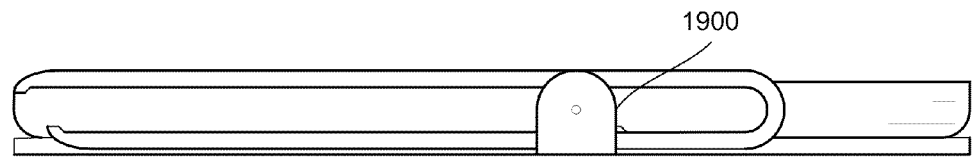
FIG. 19C is a side perspective view of the system in FIG. 19A when the keyboard is in a stored position with the exemplary display facing away from the keyboard in a "slate" mode.

FIGS. 19A-19C show side perspective views of a system for implementing the storable, or ultrathin, keyboard in a stored mode, operational mode, and slate mode, respectively. Upon actuation of a control member 1900 about a rotating axis, which may be located toward the center of the system, the aforementioned base frame within the keyboard is moved, causing the keyboard to collapse into a storage position, as shown in FIGS. 19A and 19C, or reengage/pop-up, as shown in FIG. 19B. When in the operational mode, as shown in FIG. 19B, support members 1902 may support a device 1904, such as a display, tablet, slate computer, or similar device, for viewing by a user. The support members 1902 may be sleeves that supportably receive device 1904 as shown in FIGS. 19A-19C, or support members 1902 could equally be rails that slide into corresponding grooves on the sides of device 1904. Additionally, support members 1902 could be members comprising grooves that correspond to sliding rails on the sides of device 1904. Support members 1902 may further be any other suitable contour known to a person of ordinary skill in the art. Furthermore, control member 1900 can be located anywhere on the system, such as toward the end of the device, for example, as it may be implemented with suitable support members known to a person of ordinary skill in the art. Furthermore, the configuration shown in FIGS. 19A-19C may be used with the ultrathin keyboard embodiments and/or with the storable keyboard embodiments, both described above.

FIGS. 20A-20C show side perspective views of a system for implementing the storable keyboard in a stored mode, operational mode, and slate mode, respectively. Control member 2000 is located toward the end of the system while the system is in the stored mode or the slate mode. Upon actuation via a sliding movement, control member 2000 controls the movement of the aforementioned base frame within the keyboard, causing the keyboard to reengage/pop-up, as shown in FIG. 20B, or collapse into a storage position as shown in FIGS. 20A and 20C. When in the operational mode, as shown in FIG. 20B, support member 2000 supports a device 2004, such as a display, tablet, slate computer, or similar device, for viewing by a user, which is also rotatable about a rotating axis. Furthermore, the configuration shown in FIGS. 20A-20C may be used with the ultrathin keyboard embodiments and/or with the storable keyboard embodiments, both described above.

CONCLUSION

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. An apparatus comprising:
a keycap;
a keyswitch mechanism coupled to the keycap and configured to enable controlled movement of the keycap along a first axis when the keycap is being depressed, the first axis running from the keycap to a base frame;
a base coupled to the keyswitch mechanism;
the base frame proximate to the base and configured to translate from a first position to a second position, the translation being in a direction that is transverse to the first axis; and
a biasing mechanism to bias the keycap into an operating position, the biasing mechanism comprising a first portion coupled to one of the keycap or the keyswitch mechanism and a second portion coupled to the base frame, the biasing mechanism being one of a magnetic biasing mechanism or an arch-shaped spring mechanism including a curved biasing member with two fixed endpoints, the biasing mechanism configured to impart a force to bias the keycap into the operating position when the base frame is in the first position, the second portion being configured to translate in the direction to a different position such that the force is at least partially eliminated when the base frame is in the second position.

2. The apparatus of claim 1, wherein a keyboard is configured to collapse into a storage position or reengage into an operating position upon translating the base frame from the first position to the second position, and wherein the keyboard is integrated with a display, the display being movable between a first configuration wherein the display is positioned on top of the keyboard and substantially parallel to the keyboard and a second configuration wherein the display is positioned at an angle relative to the keyboard for viewing by a user.

3. The apparatus of claim 1, wherein the biasing mechanism is the magnetic biasing mechanism, the apparatus further comprising a magnetic element coupled to the base frame and located a distance from the second portion, the distance being substantially equivalent to a distance required to translate the base frame in order to fully collapse or reengage the apparatus.

4. The apparatus of claim 3, wherein upon translating the base frame to the second position, the magnetic element is substantially aligned with the first portion along the first axis.

5. The apparatus of claim 3, wherein the first portion is ring-shaped and the magnetic element is configured to fit within the first portion.

6. The apparatus of claim 1, further comprising a control member configured to engage the base frame such that when the control member is actuated, the base frame translates between the first position and the second position.

7. The apparatus of claim 6, wherein the control member comprises one or more grooves configured to engage one or more corresponding teeth of the base frame.

8. The apparatus of claim 6, wherein the control member is configured to be actuated via one of rotating about an axis or via sliding the control member along a plane.

9. A keyboard key comprising:
a keycap configured to receive tactile input;
a keyswitch mechanism coupled to the keycap and configured to enable controlled movement of the keycap along a first axis in response to the tactile input;
a base coupled to the keyswitch mechanism;
a base frame proximate to the base and configured to translate from a first position to a second position, the translation being along a second axis that is perpendicular to the first axis; and
a magnetic biasing mechanism to bias the keycap into an operating position, the magnetic biasing mechanism comprising a first magnetic portion coupled to one of the keycap or the keyswitch mechanism and a second magnetic portion coupled to the base frame, the second magnetic portion configured to impart a force against the first magnetic portion to bias the keycap into the operating position when the base frame is in the first position and to translate along the second axis to a different position such that the force is at least partially eliminated when the base frame is in the second position.

10. The keyboard key of claim 9, further comprising a magnetic element that is attracted to the first magnetic portion coupled to the base frame and located a distance from the second magnetic portion, the distance being substantially equivalent to a distance required to translate the base frame in order to fully collapse or reengage the keyboard key.

11. The keyboard key of claim 9, wherein a keyboard is configured to collapse into a storage position or reengage into an operating position upon translating the base frame from the first position to the second position, and wherein the keyboard is integrated with a display, the display being movable between a first configuration wherein the display is positioned on top of the keyboard and substantially parallel to the keyboard and a second configuration wherein the display is positioned at an angle relative to the keyboard for viewing by a user.

12. An apparatus comprising:
a keycap;
a keyswitch mechanism coupled to the keycap and configured to enable controlled movement of the keycap along a first axis when the keycap is being depressed;
a base coupled to the keyswitch mechanism;
a base frame proximate to the base and configured to translate from a first position to a second position, the translation being in a direction that is transverse to the first axis, the first axis running from the keycap to the base frame; and
an arch-shaped spring mechanism to bias the keycap into an operating position, the arch-shaped spring mechanism comprising a first portion rotatably coupled to one of the keycap or the keyswitch mechanism and a second portion rotatably coupled to the base frame, the arch-shaped spring mechanism configured to impart a force to bias the keycap into the operating position when the base frame is in the first position, the second portion being configured to translate in the direction to a different position such that the force to bias the keycap into the operating position is at least partially eliminated when the base frame is in the second position.

13. The apparatus of claim 12, wherein the keyswitch mechanism is of a scissor-type.

14. The apparatus of claim 12, further comprising a connecting element coupled to the base frame, wherein the second portion is rotatably coupled to the connecting element.

15. The apparatus of claim 12, wherein the arch-shaped spring mechanism is integrally formed as part of the keyswitch mechanism.

16. The apparatus of claim 12, wherein a keyboard is configured to collapse into a storage position or reengage into an operating position upon translating the base frame from the first position to the second position.

17. The apparatus of claim 16, wherein the keyboard is integrated with a display, the display being movable between a first configuration wherein the display is positioned on top of the keyboard and substantially parallel to the keyboard and a second configuration wherein the display is positioned at an angle relative to the keyboard for viewing by a user.

18. The apparatus of claim 12, further comprising a control member configured to engage the base frame such that when the control member is actuated, the base frame translates between the first position and the second position.

19. The apparatus of claim 18, wherein the control member is configured to be actuated via one of rotating about an axis or via sliding the control member along a plane.

20. The apparatus of claim 18, wherein the control member comprises one or more grooves configured to engage one or more corresponding teeth of the base frame.

* * * * *